US012719111B2

(12) United States Patent
Maguire et al.

(10) Patent No.: US 12,719,111 B2
(45) Date of Patent: Aug. 25, 2026

(54) MULTIFUNCTIONAL CROSS-MEMBER BEAMS FOR TRACTION BATTERY PACKS

(71) Applicant: FORD GLOBAL TECHNOLOGIES, LLC, Dearborn, MI (US)

(72) Inventors: Patrick Daniel Maguire, Ann Arbor, MI (US); Deanna Marie Winton Hoffman, Ann Arbor, MI (US); Brock Dunlap, Dearborn, MI (US); Michael E. Reibling, Sterling Heights, MI (US); Marc Dugas, Wixom, MI (US); Mohammadreza Eftekhari, Novi, MI (US); Adam Denlinger, Saline, MI (US); David Wilson, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 810 days.

(21) Appl. No.: 18/105,410

(22) Filed: Feb. 3, 2023

(65) Prior Publication Data

US 2024/0079681 A1 Mar. 7, 2024

Related U.S. Application Data

(60) Provisional application No. 63/403,445, filed on Sep. 2, 2022.

(51) Int. Cl.

| | |
|---|---|
| ***H01M 10/658*** | (2014.01) |
| ***H01M 10/625*** | (2014.01) |
| ***H01M 10/6557*** | (2014.01) |
| ***H01M 50/249*** | (2021.01) |
| ***H01M 50/264*** | (2021.01) |

(52) U.S. Cl.

CPC ....... *H01M 10/658* (2015.04); *H01M 10/625* (2015.04); *H01M 10/6557* (2015.04); *H01M 50/249* (2021.01); *H01M 50/264* (2021.01); *H01M 2220/20* (2013.01)

(58) Field of Classification Search

CPC . H01M 50/204; H01M 50/244; H01M 50/264

See application file for complete search history.

(56) References Cited

U.S. PATENT DOCUMENTS

| | | | | |
|---|---|---|---|---|
| 10,804,505 | B2 | 10/2020 | Nakai et al. | |
| 2011/0020690 | A1 | 1/2011 | Khakhalev et al. | |
| 2013/0196211 | A1 | 8/2013 | Park et al. | |
| 2016/0248062 | A1 | 8/2016 | Lee | |
| 2019/0280279 | A1* | 9/2019 | Lee | H01M 50/50 |
| 2021/0320363 | A1 | 10/2021 | Kim | |
| 2022/0242214 | A1* | 8/2022 | Binder | H01M 50/249 |
| 2022/0271395 | A1 | 8/2022 | Hwang et al. | |

* cited by examiner

*Primary Examiner* — Christopher P Domone

(74) *Attorney, Agent, or Firm* — David B. Kelley; Carlson, Gaskey & Olds, P.C.

(57) ABSTRACT

Multifunctional cross-member beams are provided for use within traction battery packs. An exemplary cross-member beam may include features for interfacing with and supporting various subcomponents (e.g., battery cells, cell tab terminals, bus bars, thermal barriers, etc.) of a cell stack of the traction battery pack. The cross-member beam may further incorporate features for facilitating the venting of battery cell vent byproducts during battery thermal events.

15 Claims, 5 Drawing Sheets

MULTIFUNCTIONAL CROSS-MEMBER BEAMS FOR TRACTION BATTERY PACKS

CROSS-REFERENCE TO RELATED APPLICATIONS

This disclosure claims priority to U.S. Provisional Application No. 63/403,445, which was filed on Sep. 2, 2022 and is incorporated herein by reference.

TECHNICAL FIELD

This disclosure relates generally to traction battery packs, and more particularly to multifunctional cross-member beams for interfacing with and supporting various subcomponents of a cell stack of the traction battery pack.

BACKGROUND

Electrified vehicles include a traction battery pack for powering electric machines and other electrical loads of the vehicle. The traction battery pack includes a plurality of battery cells and various other battery internal components that support electric vehicle propulsion.

SUMMARY

A traction battery pack according to an exemplary aspect of the present disclosure includes, among other things, a cell stack including a first cross-member beam, a first battery cell including a first cell tab terminal that extends through a first cell tab opening of the first cross-member beam, and a second battery cell including a second cell tab terminal that extends through a second cell tab opening of the first cross-member beam. The first cell tab terminal overlaps the second cell tab terminal.

In a further non-limiting embodiment of the foregoing traction battery pack, the first battery cell and the second battery cell are part of a cell packet that is supported between the first cross-member beam and a second cross-member beam.

In a further non-limiting embodiment of either of the foregoing traction battery packs, the cell packet further includes a structural thermal barrier located between the first battery cell and the second battery cell.

In a further non-limiting embodiment of any of the foregoing traction battery packs, the first cross-member beam further includes a channel sized to receive a protruding barb of the structural thermal barrier.

In a further non-limiting embodiment of any of the foregoing traction battery packs, a third cross-member beam is adjacent to the first cross-member beam. The first cross-member beam and the third cross-member beam establish a cross-member assembly arranged between the cell stack and a second cell stack of the traction battery pack.

In a further non-limiting embodiment of any of the foregoing traction battery packs, a venting passageway is disposed between the first cross-member beam and the third cross-member beam.

In a further non-limiting embodiment of any of the foregoing traction battery packs, an enclosure cover provides a vertically upper side of the venting passageway, and an enclosure tray or a heat exchanger plate provides a vertically lower side of the venting passageway.

In a further non-limiting embodiment of any of the foregoing traction battery packs, a vent opening formed through the first cross-member beam establishes a venting path between the cell stack and the venting passageway.

In a further non-limiting embodiment of any of the foregoing traction battery packs, a backing tab of the first cross-member beam separates the first cell tab opening from the second cell tab opening.

In a further non-limiting embodiment of any of the foregoing traction battery packs, the backing tab establishes a backing surface for joining the first and second cell tab terminals together.

In a further non-limiting embodiment of any of the foregoing traction battery packs, the first cell tab terminal overlaps the second cell tab terminal on an opposite side of the first cross-member beam from the first and second battery cells.

In a further non-limiting embodiment of any of the foregoing traction battery packs, a weld bead joins the first cell tab terminal to the second cell tab terminal.

In a further non-limiting embodiment of any of the foregoing traction battery packs, the first cross-member beam includes a beam body, a first reinforcement section that establishes a first pultrusion, and a second reinforcement section that establishes a second pultrusion.

In a further non-limiting embodiment of any of the foregoing traction battery packs, the first pultrusion is disposed within an upper portion of the beam body, and the second pultrusion is disposed within a lower portion of the beam body.

In a further non-limiting embodiment of any of the foregoing traction battery packs, the first cross-member beam further includes a slot sized to receive a bus bar.

A traction battery pack according to another exemplary aspect of the present disclosure includes, among other things, a first cell stack, a second cell stack, and a cross-member assembly arranged between the first cell stack and the second cell stack. The cross-member assembly includes a first cross-member beam that supports the first cell stack, and a second cross-member beam that supports the second cell stack.

In a further non-limiting embodiment of the foregoing traction battery pack, a venting passageway is disposed between the first cross-member beam and the second cross-member beam.

In a further non-limiting embodiment of either of the foregoing traction battery packs, an enclosure cover provides a vertically upper side of the venting passageway, and an enclosure tray or a heat exchanger plate provides a vertically lower side of the venting passageway.

In a further non-limiting embodiment of any of the foregoing traction battery packs, the first cross-member beam and the second cross-member beam each include a vent opening that is fluidly connectable to the venting passageway.

In a further non-limiting embodiment of any of the foregoing traction battery packs, the first cross-member beam includes a cell tab opening for receiving a cell tab terminal of a battery cell of the first cell stack.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details multifunctional cross-member beams for use within traction battery packs. An exemplary cross-member beam may include features for interfacing with and supporting various subcomponents (e.g., battery cells, cell tab terminals, bus bars, thermal barriers, etc.) of a cell stack of the traction battery pack. The cross-member beam may further incorporate features for facilitating the venting of battery cell vent byproducts during battery thermal events. These and other features are discussed in greater detail in the following paragraphs of this detailed description.

Figure 1:
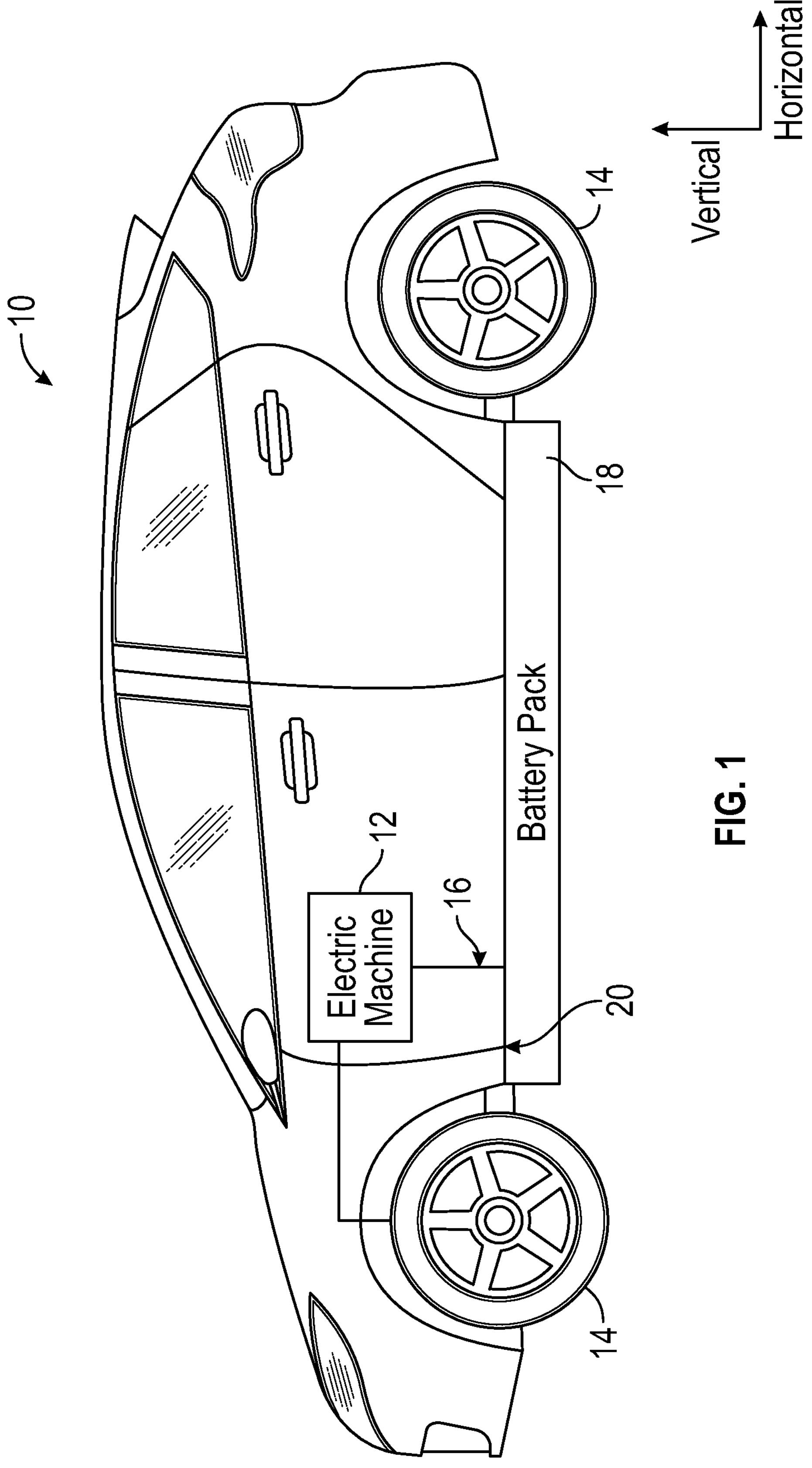
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the powertrain of the electrified vehicle 10 could be equipped with an internal combustion engine that can be employed either alone or in combination with other power sources to propel the electrified vehicle 10.

In the illustrated embodiment, the electrified vehicle 10 is depicted as a car. However, the electrified vehicle 10 could alternatively be a sport utility vehicle (SUV), a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10.

A voltage bus 16 may electrically couple the electric machine 12 to a traction battery pack 18. The traction battery pack 18 is an exemplary electrified vehicle battery. The traction battery pack 18 may be a high voltage traction battery pack assembly that includes a plurality of battery cells capable of outputting electrical power to power the electric machine 12 and/or other electrical loads of the electrified vehicle 10. Other types of energy storage devices and/or output devices could alternatively or additionally be used to electrically power the electrified vehicle 10.

The traction battery pack 18 may be secured to an underbody 20 of the electrified vehicle 10. However, the traction battery pack 18 could be located elsewhere on the electrified vehicle 10 within the scope of this disclosure.

Figures 2, 3:
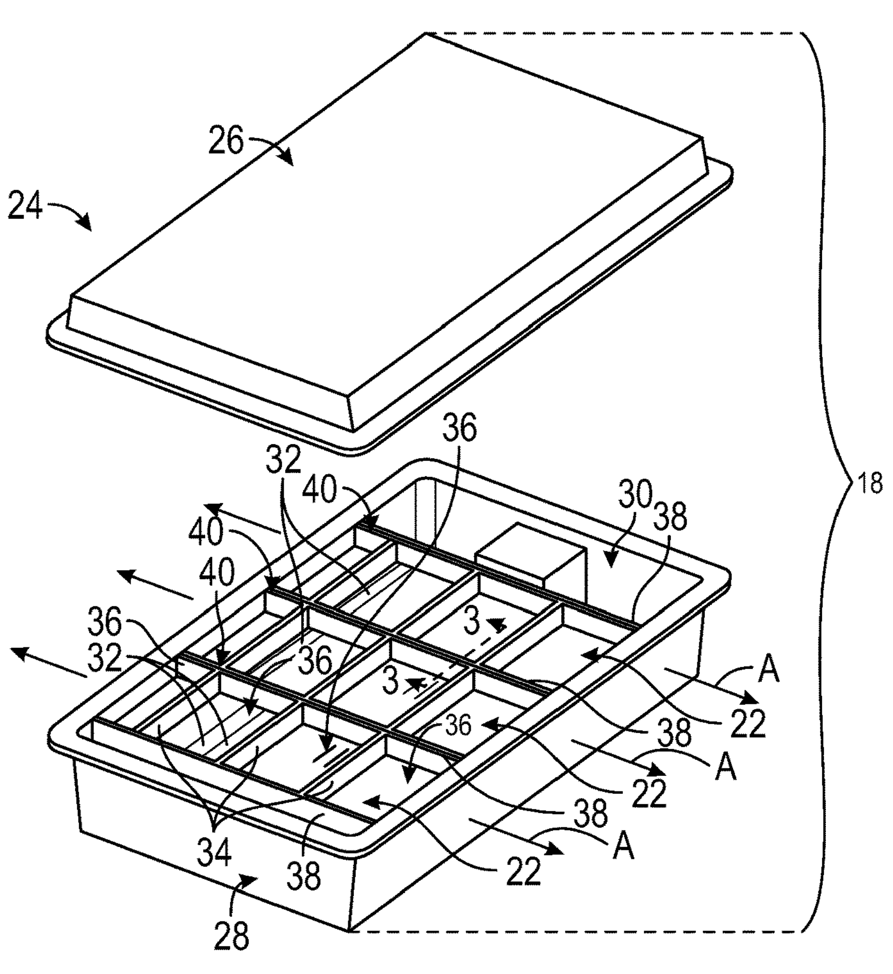
FIG. 2 is an exploded perspective view of a traction battery pack for an electrified vehicle.
FIG. 3 is a cross-sectional view through section 3-3 of FIG. 2.

FIGS. 2 and 3 further illustrates details associated with the traction battery pack 18 of the electrified vehicle 10. The traction battery pack 18 may include a plurality of cell stacks 22 housed within an interior area 30 of an enclosure assembly 24. The enclosure assembly 24 of the traction battery pack 18 may include an enclosure cover 26 and an enclosure tray 28. The enclosure cover 26 may be secured (e.g., bolted, welded, adhered, etc.) to the enclosure tray 28 to provide the interior area 30 for housing the cell stacks 22 and other battery internal components of the traction battery pack 18.

Each cell stack 22 may include a plurality of battery cells 32. The battery cells 32 of each cell stack 22 may be stacked side-by-side relative to one another along a cell stack axis A. The battery cells 32 store and supply electrical power for powering various components of the electrified vehicle 10. Although a specific number of the cell stacks 22 and battery cells 32 are illustrated in the various figures of this disclosure, the traction battery pack 18 could include any number of the cell stacks 22, with each cell stack 22 having any number of individual battery cells 32.

In an embodiment, the battery cells 32 are lithium-ion pouch cells. However, battery cells having other geometries (cylindrical, prismatic, etc.) and/or chemistries (nickel-metal hydride, lead-acid, etc.) could alternatively be utilized within the scope of this disclosure.

One or more structural thermal barriers 34 may be arranged along the respective cell stack axis A of each cell stack 22. The structural thermal barriers 34 may compartmentalize each cell stack 22 into two or more groupings or compartments 36 of battery cells 32. Each compartment 36 may hold one or more of the battery cells 32 within one of the cell stacks 22. In an embodiment, the battery cells 32 of each cell stack 22 are held within one of four compartments 36. However, other configurations, including configurations that utilize a greater or fewer number of compartments 36, could be used within the scope of this disclosure.

The battery cells 32 of each cell stack 22 may be arranged between a pair of cross-member beams 38. The cross-member beams 38 may be configured to hold the battery cells 32 and at least partially delineate the cell stacks 22.

The cross-member beams 38 may be adhesively secured to the enclosure cover 26 and to either the enclosure tray 28 or a heat exchanger plate 44 positioned between the enclosure tray 28 and one or more cell stacks 22. The adhesive can seal these interfaces to inhibit battery cell vent byproducts escaping through these areas.

Immediately adjacent-cross member beams 38 may established a cross-member assembly 40 disposed between adjacent cell stacks 22 of the traction battery pack 18. The cross-member assemblies 40 may be configured to transfer a load applied to a side of the electrified vehicle 10, for example. Each cross-member beam 38 of the cross-member assemblies 40 may be a structural beam that can help accommodate tension loads from battery cell 32 expansion and compression loads. The cross-member assemblies 40 are therefore configured to increase the structural integrity of the traction battery pack 18.

The cross-member assembles 40 may also establish a battery pack venting system for communicating battery cell vent byproducts from the traction battery pack 18 during battery thermal events. For example, the cross-member assemblies 40 may establish passageways 42 (best shown in FIG. 3) that communicate the battery cell vent byproducts from the cell stacks 22 toward a position where the battery cell vent byproducts can be expelled from the traction battery pack 18.

In the exemplary embodiment illustrated in FIG. 3, first and second adjacent cross-member beams 38 may establish a first side and a second side, respectively, of the passageway 42 of the cross-member assembly 40. Further, a vertically upper side of the passageway 42 may be established by the enclosure cover 26, and a vertically lower side of the passageway 42 may be established by a heat exchanger plate 44 positioned against the enclosure tray 28. In another embodiment, the heat exchanger plate 44 may be omitted and the vertically lower side of the passageway 42 may be established by the enclosure tray 28. Vertical and horizontal, for purposes of this disclosure, are with reference to ground and a general orientation of traction battery pack 18 when installed within the electrified vehicle 10 of FIG. 1.

In an embodiment, the cell stacks 22, the cross-member assemblies 40, and the respective passageways 42 extend longitudinally in a cross-vehicle direction. However, other configurations are further contemplated within the scope of this disclosure.

Figure 4:
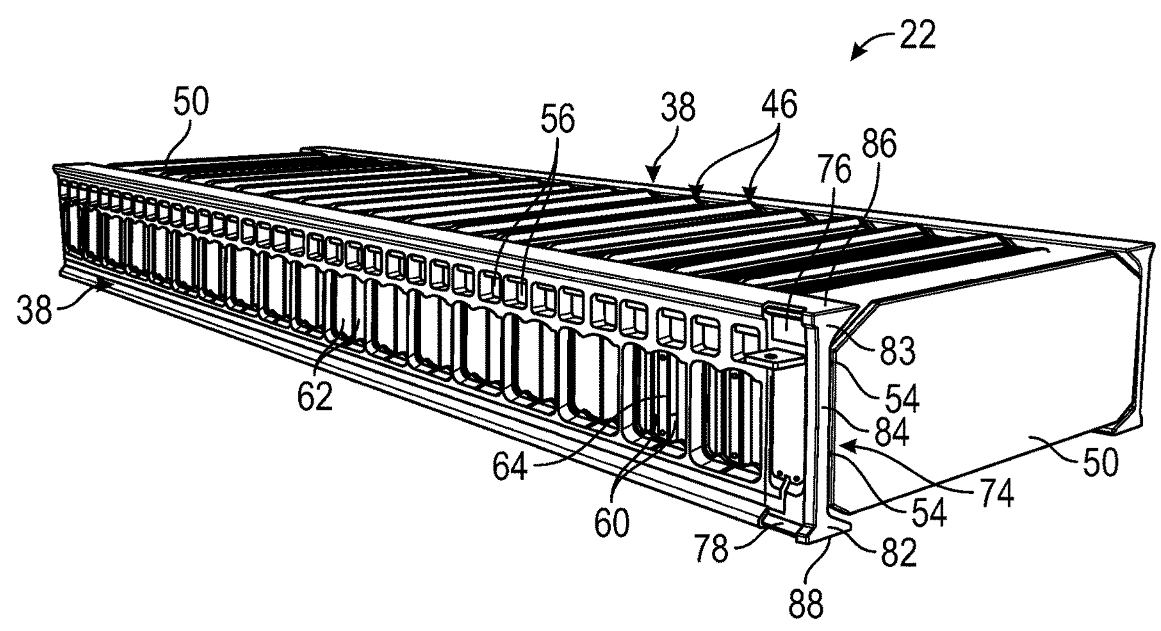
FIG. 4 illustrates an exemplary cell stack of the traction battery pack of FIGS. 2 and 3.
Figure 5:
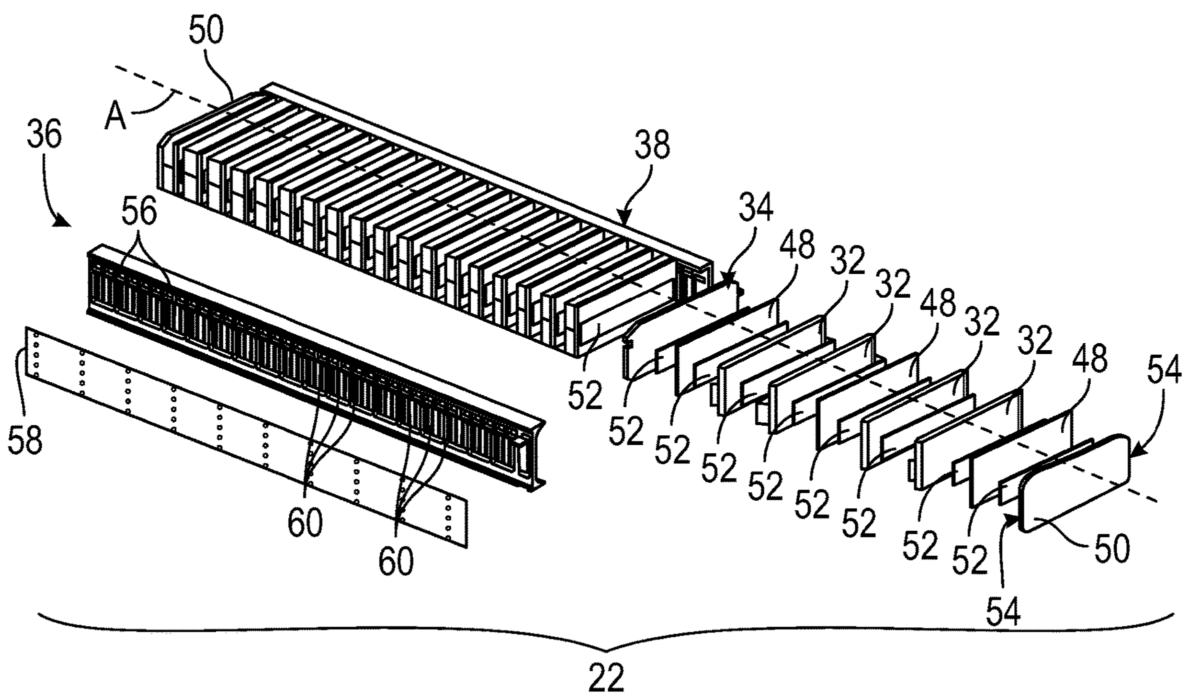
FIG. 5 is a partially exploded view of the cell stack of FIG. 4.

FIGS. 4 and 5, with continued reference to FIGS. 2 and 3, illustrate an exemplary design of a cell stack 22 of the traction battery pack 18. Additional cell stacks 22 of the traction battery pack 18 could include an identical design to the cell stack 22 shown in FIGS. 4-5 or a similar design as its electrical connections with neighboring cell stacks can vary in order to complete a necessary electrical circuit.

The cell stack 22 may include a plurality of cell packets 46 stacked horizontally between a pair of cross-member beams 38 and longitudinally (e.g., side-by-side along the cell stack axis A) between a pair of compression plates 50. The total number of cell packets 46 provided within the cell stack 22 may vary and is therefore not intended to limit this disclosure.

Each compression plate 50 may be made of a plastic material. The compression plates 50 may be configured to accommodate and maintain compression of the cell stack 22 along the cell stack axis A. The compression plates 50 may be attached to the cross-member beams 38. In an embodiment, the compression plates 50 include tabs 54 that are received by the cross-member beams 38.

Each cell packet 46 of the cell stack 22 may include a combination of battery cells 32, one or more structural thermal barriers 34, and one or more cell expansion pads 48 that are stacked together along the cell stack axis A. An exemplary stacking configuration of each cell packet 46 may include the following arrangement of subcomponents: battery cell 32-battery cell 32-cell expansion pad 48-structural thermal barrier 34-cell expansion pad 48-battery cell 32-battery cell 32-cell expansion pad 48. However, the cell packets 46 could embody various other stacking arrangements/configurations within the scope of this disclosure.

The various subcomponents of each cell packet 46 may be secured together using an adhesive, such as strips of two-sided adhesive tape 52, for example. The strips of the two-sided adhesive tape 52 may be interspersed between each adjacent pair of subcomponents of the cell packet 46.

The structural thermal barriers 34 may each include a single-piece structure or a multi-layered sandwich structure that is configured to slow or even prevent thermal propagation from cell packet-to-cell packet across the cell stack 22. In an embodiment, the structural thermal barriers 34 may be made of a metallic material, such as stainless steel or aluminum, or a thermoplastic material, for example. In another embodiment, the structural thermal barriers 34 include an insulating material(s), such as aerogel materials or foam materials. However, other material or combinations of materials could with utilized to provide the structural thermal barriers 34 with insulative properties within the scope of this disclosure.

The cell expansion pads 48 may include a compliant material(s) for accommodating battery cell swelling. The compliant material may include polyurethane foam or silicone foam, for example. However, other materials or combinations of materials could be utilized to provide the cell expansion pads 48 with compliant properties within the scope of this disclosure.

Each cross-member beam 38 may include a beam body 74 and one or more reinforcement sections. In the illustrated embodiment, the cross-member beam 38 includes an upper or first reinforcement section 76 and a lower or second reinforcement section 78. However, other configurations are also contemplated within the scope of this disclosure.

The beam body 74 may be a unitary structure that includes an upper portion 83, a lower portion 82, and a mid-portion 84 extending between and connecting the upper portion 83 and the lower portion 82. The upper portion 83 may establish an upper plateau 86 of the cross-member beam 38, and the lower portion 82 may establish a lower base 88 of the cross-member beam 38. When positioned within the enclosure assembly 24 of the traction battery pack 18 in the manner shown in FIG. 3, the upper plateau 86 may interface with the enclosure cover 26, and the lower base 88 may interface with the heat exchanger plate 44 or the enclosure tray 28.

The beam body 74 of each cross-member beam 38 may be made of any suitable thermoplastic material. In an embodiment, the beam body 74 is overmolded about each of the first reinforcement section 76 and the second reinforcement section 78. The first reinforcement section 76 may therefore extend inside the upper portion 83 of the beam body 74, and the second reinforcement section 78 may extend inside the lower portion 82 of the beam body 74. The first and second first reinforcement sections 76, 78 may therefore be positioned to structurally reinforce select portions (e.g., stress areas) of the beam body 74.

In an embodiment, the beam body 74, the first reinforcement section 76, and the second reinforcement section 78 each include substantially equivalent lengths. In other implementations, the length of the beam body 74 may be greater than the respective lengths of the first and second first reinforcement sections 76, 78.

In an embodiment, the first and second first reinforcement sections 76, 78 are pultrusions, which implicates structure to these beam-like sections. A person of ordinary skill in the art having the benefit of this disclosure would understand how to structurally distinguish a pultruded beam structure from another type of structure, such as an extruded beam, for example.

The first and second first reinforcement sections 76, 78 may be manufactured as part of a pultrusion process that utilizes a glass or carbon fiber (unidirectional or multidirectional mat) and a thermoset resin. A plurality of glass or carbon fiber strands may be pulled through the thermoset resin as part of the pultrusion process for manufacturing the first and second first reinforcement sections 76, 78. The first and second first reinforcement sections 76, 78 may then be overmolded by the beam body 74 to provide a desired cross-section of the cross-member beam 38. The beam body 74 may be made of any suitable thermoplastic material.

Each cross-member beam 38 of the cell stack 22 may include a plurality of vent openings 56 for communicating battery cell vent byproducts through the beams and into one of the passageways 42 (note that the passageway 42 is best shown in FIG. 3). The vent openings 56 thus provide a path for battery cell vent byproducts to move through the cross-member beams 38 and into the passageways 42 as required during a venting event.

The vent openings 56 may be formed through the beam body 74 of the cross-member beam 38. In an embodiment, the vent openings 56 are formed through the mid-portion 84 of the beam body 74.

When the battery cells 32 of the cell stack 22 are not venting, the vent openings 56 may be covered by a sectioned membrane 58. A pressure differential increase associated with one or more of the battery cells 32 venting can rupture the a local section of the sectioned membrane 58, thereby allowing the battery cell vent byproducts to pass through the vent openings 56 for a single cell packet 46 experiencing a thermal event into the passageway 42. The local sections of the sectioned membrane 58 may locally break away when the single cell packet 46 experiences the thermal event to release the battery cell vent byproducts into the passageway 42. The battery cell vent byproducts may exit on both sides of the cell stack 22 from one cell packet 46.

Each cross-member beam 38 may additionally include a plurality of cell tab openings 60 arranged vertically below the vent openings 56. The cell tab openings 60 may be formed through the beam body 74. In an embodiment, the cell tab openings 60 are formed through the mid-portion 84 of the beam body 74.

Each cell tab opening 60 may be configured to accommodate a cell tab terminal 62 of the battery cells 32. The cell tab terminals 62 extend from a battery cell housing. An aluminum film may provide the battery cell housing, for example.

Figure 6:
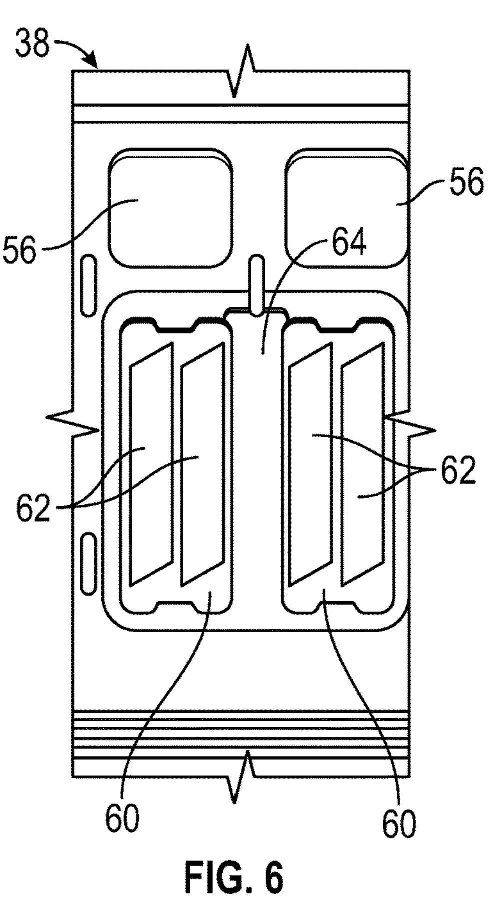
FIG. 6 illustrates select portions of a cross-member beam of a cell stack.

In an embodiment, each cell tab opening 60 may accommodate one cell tab terminal 62. In another embodiment, each cell tab opening 60 may be sized to receive cell tab terminals 62 from multiple adjacent battery cells 32 (see, e.g., FIG. 6). Battery vent byproducts may at least partially vent through each cell tab opening 60 in addition to the vent openings 56 during thermal events.

Figure 7:
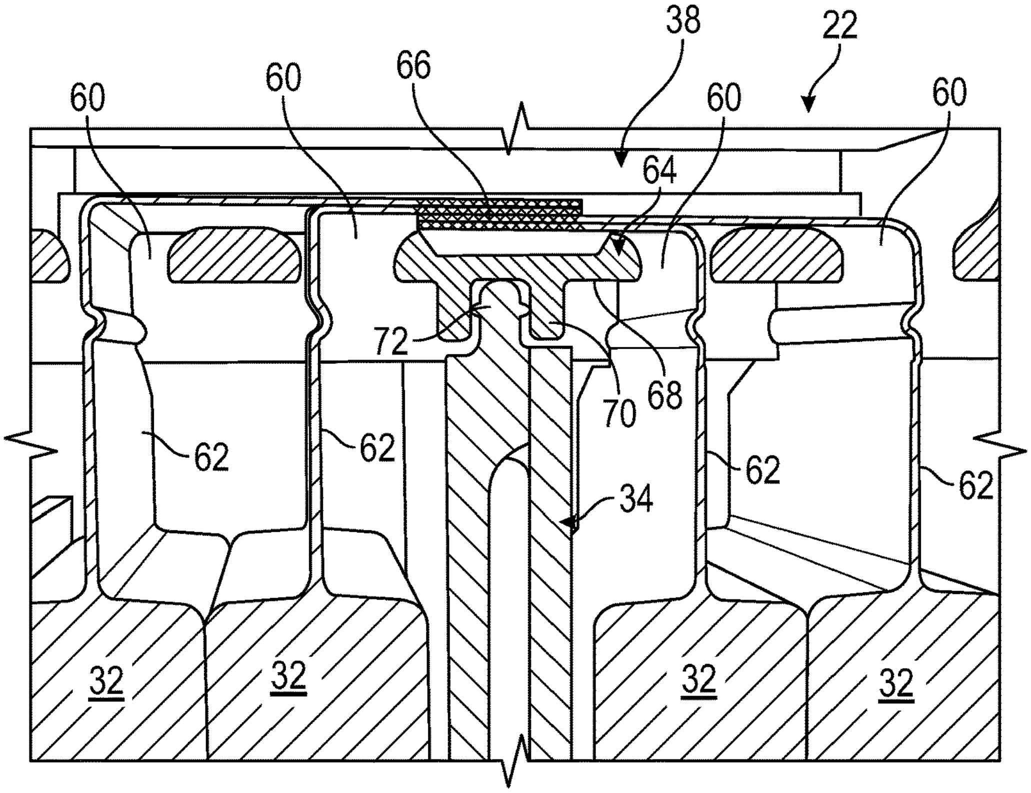
FIG. 7 is a cross-sectional view of a portion of a traction battery pack.

Referring now primarily to FIG. 7 (with continued reference to FIGS. 2-5), at least a portion of adjacent cell tab openings 60 may be separated by a backing tab 64 of the cross-member beam 38. The cross-member beams 38 may each include multiple backing tabs 64. Each backing tab 64 may provide a suitable backing surface for joining (e.g., welding) the cell tab terminals 62 together in order to electrically connect the battery cells 32 of the cell packet 46. To electrically connect the cell tab terminals 62, the cell tab terminals 62 may be extended through their respective cell tab openings 60 and then folded over the backing tab 64 such that the cell tab terminals 62 overlap one another. When folded, the cell tab terminals 62 are located on an opposite side of the cross-member beam 38 from the housings of the battery cells 32. A weld bead 66, such as that created during a laser welding process, for example, may then be applied to the overlapped cell tab terminals 62 for electrically connecting the cell tab terminals 62.

The backing tab 64 may additionally provide a sense lead that can be used to collect data. For example, a voltage of the cell tab terminals 62 of the battery cells 32 may be monitored and collected by the backing tab 64.

An inside surface 68 of the backing tab 64 (e.g. the surface that faces toward the cell packets 46), or the cross-member beam 38 to which the backing tab 64 may be attached, may interface with the structural thermal barrier 34 of the cell packet 46. For example, the inside surface 68 may include a C-channel 70 that is sized to accommodate a protruding barb 72 of the structural thermal barrier 34. Together, the protruding barb 72 and the C-channel 70 establish a tongue-and-groove connection between the structural thermal barrier 34 and the cross-member beam 38.

Figure 8:
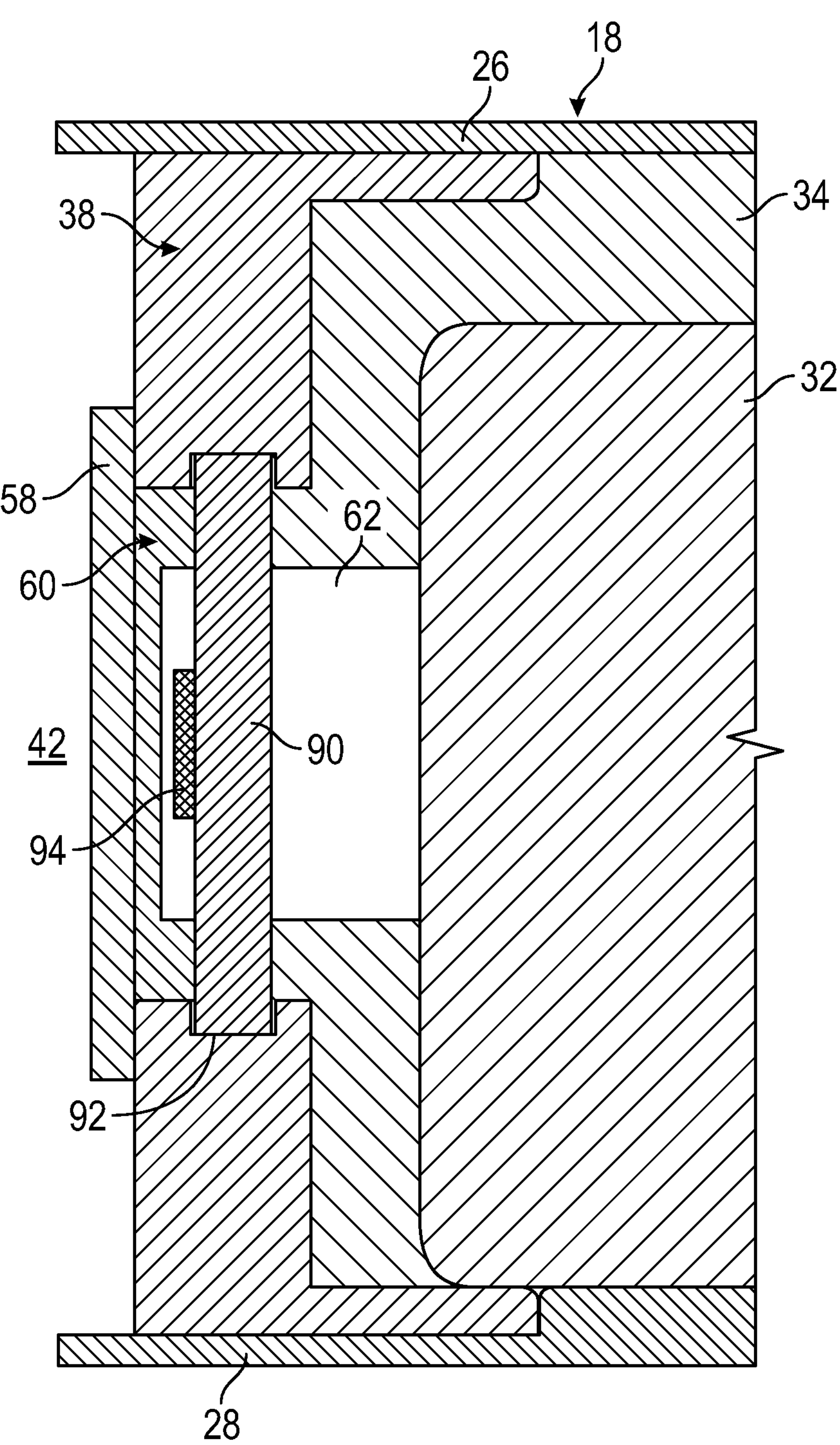
FIG. 8 is a cross-sectional view of another portion of a traction battery pack.

Each cross-member beam 38 may further include features for supporting one or more bus bars that may be utilized to electrically connect the cell packets 46 of the cell stack 22. Referring to FIG. 8, for example, each cross-member beam 38 may include a slot 92 configured to support a bus bar 90. The slot 92 may extend outwardly from both an upper and lower section of the cell tab opening 60. The slot 92 is therefore configured to support both upper and lower sections of the bus bar 90.

The bus bar 90 may be inserted into the slot 92 either prior to or during welding of the cell tab terminals 62. The bus bar 90 may be secured to the cell tab terminals 62 by an additional weld bead 94.

The multifunctional cross-member beams of this disclosure are capable of supporting various subcomponents of a battery cell stack. For example, the cross-member beams may provide features for supporting battery cells, cell tab terminals, bus bars, thermal barriers, etc. of the cell stack. The cross-member beams may further incorporate features for facilitating the venting of battery cell vent byproducts during battery thermal events.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:

a cell stack comprising:

a first cross-member beam;

a first battery cell including a first cell tab terminal that extends through a first cell tab opening of the first cross-member beam; and a second battery cell including a second cell tab terminal that extends through a second cell tab opening of the first cross-member beam, wherein the first cell tab terminal overlaps the second cell tab terminal.

2. The traction battery pack as recited in claim 1, wherein the first battery cell and the second battery cell are part of a cell packet that is supported between the first cross-member beam and a second cross-member beam.

3. The traction battery pack as recited in claim 2, wherein the cell packet further includes a structural thermal barrier located between the first battery cell and the second battery cell.

4. The traction battery pack as recited in claim 3, wherein the first cross-member beam further includes a channel sized to receive a protruding barb of the structural thermal barrier.

5. The traction battery pack as recited in claim 3, comprising a third cross-member beam adjacent to the first cross-member beam, wherein the first cross-member beam and the third cross-member beam establish a cross-member assembly arranged between the cell stack and a second cell stack of the traction battery pack.

6. The traction battery pack as recited in claim 5, comprising a venting passageway disposed between the first cross-member beam and the third cross-member beam.

7. The traction battery pack as recited in claim 6, wherein an enclosure cover provides a vertically upper side of the venting passageway, and an enclosure tray or a heat exchanger plate provides a vertically lower side of the venting passageway.

8. The traction battery pack as recited in claim 6, wherein a vent opening formed through the first cross-member beam establishes a venting path between the cell stack and the venting passageway.

9. The traction battery pack as recited in claim 1, wherein a backing tab of the first cross-member beam separates the first cell tab opening from the second cell tab opening.

10. The traction battery pack as recited in claim 9, wherein the backing tab establishes a backing surface for joining the first and second cell tab terminals together.

11. The traction battery pack as recited in claim 10, wherein the first cell tab terminal overlaps the second cell tab terminal on an opposite side of the first cross-member beam from the first and second battery cells.

12. The traction battery pack as recited in claim 9, comprising a weld bead that joins the first cell tab terminal to the second cell tab terminal.

13. The traction battery pack as recited in claim 1, wherein the first cross-member beam includes a beam body, a first reinforcement section that establishes a first pultrusion, and a second reinforcement section that establishes a second pultrusion.

14. The traction battery pack as recited in claim 13, wherein the first pultrusion is disposed within an upper portion of the beam body, and the second pultrusion is disposed within a lower portion of the beam body.

15. The traction battery pack as recited in claim 1, wherein the first cross-member beam further includes a slot sized to receive a bus bar.

* * * * *